United States Patent [19]
Cohen

[11] Patent Number: 5,734,542
[45] Date of Patent: Mar. 31, 1998

[54] DUAL-LINE DUAL-VOLTAGE TELECOMMUNICATIONS SURGE PROTECTOR

[75] Inventor: Richard L. Cohen, Novato, Calif.

[73] Assignee: Panamax Corporation, San Rafael, Calif.

[21] Appl. No.: 655,616

[22] Filed: May 30, 1996

[51] Int. Cl.$^6$ ........................ H01C 7/12
[52] U.S. Cl. ............... 361/119; 361/56; 361/111; 379/331
[58] Field of Search ................ 361/119, 111, 361/118, 126, 127, 56; 379/331, 332; 439/218, 638, 639, 676, 701

[56] References Cited

U.S. PATENT DOCUMENTS

| | | | |
|---|---|---|---|
| 4,438,477 | 3/1984 | Cawley | 361/119 |
| 4,743,999 | 5/1988 | Hames | 361/56 |
| 5,377,067 | 12/1994 | Tanaka et al. | 361/104 |

OTHER PUBLICATIONS

Model 343B In-Range Out-of-Building (IROB) Protector, CIB 3141: Installation Instructions, PEC 32918, AT&T, Copyright 1991.

*Primary Examiner*—Fritz Fleming
*Assistant Examiner*—Michael J. Sherry
*Attorney, Agent, or Firm*—Limbach & Limbach & LLP

[57] ABSTRACT

A surge protection module which provides surge protection for at least two telecommunications lines, with some wires of each telecommunication line being protected according to a first limiting voltage, and other the wires of the telecommunications line being protected according to a second limiting voltage.

11 Claims, 3 Drawing Sheets

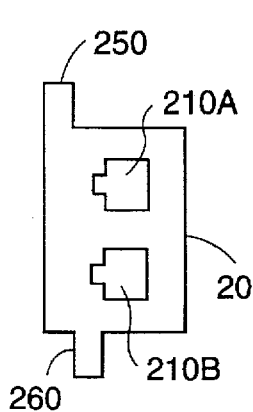
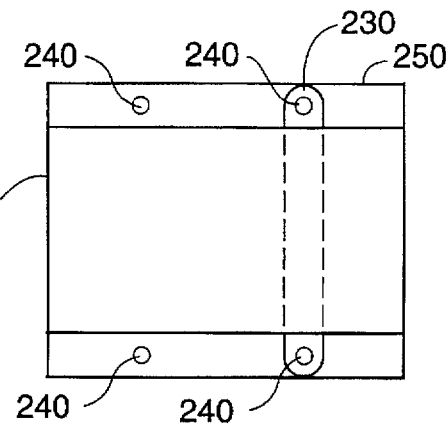
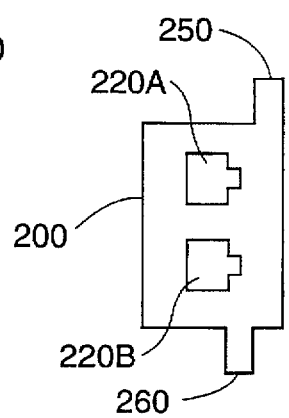
FIG. 2A     FIG. 2B     FIG. 2C
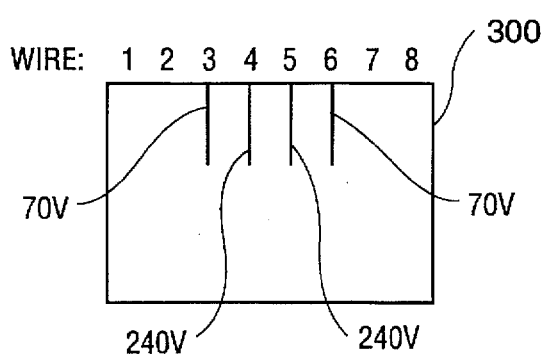
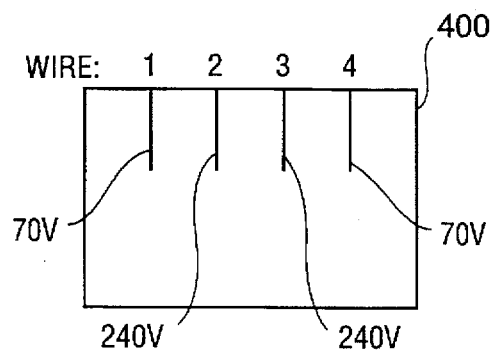
FIG. 3     FIG. 4

DUAL-LINE DUAL-VOLTAGE TELECOMMUNICATIONS SURGE PROTECTOR

BACKGROUND OF THE INVENTION

The present invention relates to telecommunication line surge protectors. More specifically, the present invention relates to a surge protector which provides surge protection for two telecommunications lines, wherein each line includes wires of at least two different maximum expected voltages.

DESCRIPTION OF THE RELATED ART

Telecommunications lines are subject to accidental electrical surges. Such surges are conditions of abnormally high current and/or voltage. Surges can be caused by lightning or short circuits. A surge can cause permanent damage to devices, such as telephone sets, which are connected to the telecommunications line.

A typical telecommunications line includes at least two, discrete wires. However, many telecommunications lines contain more than two wires. For instance, telecommunications lines having four or eight wires are common. Normally, each wire of a telecommunications line will have the same, maximum expected voltage. The maximum expected voltage is the greatest voltage which is expected during operation of the telecommunications line. The maximum nominal voltage depends upon the telecommunications equipment which the telecommunications line connects.

With respect to the maximum expected voltage, it should be noted that the wires of a telecommunications line are often organized into one or more pairs. For a pair, one wire of the pair will have voltages which approach the maximum expected voltage, while the other wire will be grounded and remain close to 0 volts. However, because of variations in the way telecommunications lines are connected and constructed, it is impossible to reliably determine which wire of a pair will bear the maximum expected voltage, and which wire of the pair will be grounded. For this reason, maximum expected voltage for surge protection purposes is the same for both wires of a pair.

For instance, a first conventional telecommunications line includes two wires, each having a nominal expected voltage of about 200V (volts). A voltage of 200V is expected during a ringing operation.

A second conventional telecommunications line includes four wires, each having a maximum expected voltage of about 50V. Note that both the first and second conventional telecommunications lines each have the same maximum expected voltage for each wire.

Surge protectors for these conventional telecommunications lines should allow signals of the maximum expected voltage to reliably pass through the surge protector, while stopping signals having voltages significantly higher than the maximum expected voltage. For instance, for the first conventional telecommunications line, a surge protector which has a limiting voltage of 240V may be used. This allows the 200V ringing signal to pass (with some margin of tolerance), while stopping signals having more than 240V, which may cause damage to telecommunications equipment connected to the telecommunications line. Similarly, for the second conventional telecommunications line, a surge protector having a limiting voltage of 70V may be used. This allows the approximately 50V operating signals to pass (with some margin of tolerance), while stopping signals having more than 70V, which may cause damage to telecommunications equipment connected to the telecommunications line.

However, some types of telecommunications lines have wires (or pairs of wires) which have more than one maximum expected voltage. While there are single line telecommunications surge protectors which provide different limiting voltages for various wires of a single telephone line, these protectors provide surge protection for only one telephone line. Therefore, a separate surge protector is required for every telephone line which is to be protected. A separate surge protector housing is required for every telecommunications line which is to be protected. Much space is required because there must be a separate surge protector for each telecommunications line. Separate installation (with its associated costs) are required for each telecommunications line. Importantly, each of these single line telecommunications surge protectors require a separate connection to ground, which requires separate wiring for each telecommunications line.

SUMMARY OF THE INVENTION

It is an object of the present invention to provide a telecommunications line surge protector which can be used with telecommunications lines including wires having more than one maximum expected voltage. It is a further object of the present invention to provide a telecommunications surge protector which will protect wires of a telecommunications line according to at least two different limiting voltages. It is a further object of the present invention to provide a telecommunications surge protector which can protect at least two telecommunications lines.

According to the present invention, a telecommunications line surge protector includes a first input connector and first output connector, and a second input connector and second output connector. The first input connector and first output connector are connected by the first surge protection circuitry. The second input connector and second output connector are connected by the second surge protection circuitry.

A first telecommunications line can be connected through the first input and output connectors, to provide surge protection for the first telecommunications line. The first surge protection circuitry connects the first input connector to the first output connector by multiple wires, wherein some wire(s) are protected according to a first limiting voltage and some wire(s) are protected according to a second limiting voltage.

Likewise, a second telecommunications line can be connected through the second input and output connectors, to provide surge protection for the second telecommunications line. The second surge protection circuitry connects the first input connector to the first output connector by multiple wires, wherein some wire(s) are protected according to a third limiting voltage and some wire(s) are protected according to a fourth limiting voltage.

In this way, a singe surge protector according to the present invention can protect two telecommunications lines. Because there are wires of two different limiting voltages in the first and second surge protection circuitry, a surge protector according to the present invention can be used to protect telecommunications lines which have wires subject to two different maximum expected voltages.

BRIEF DESCRIPTION OF THE DRAWINGS

FIGS. 2A to 2C are three views of an embodiment of a telecommunication surge protector according to the present invention.

FIG. 3 is a diagram of a first connector.

FIG. 4 is a diagram of a second connector.

FIG. 5 is a diagram of surge protection circuitry of an embodiment of

DETAILED DESCRIPTION OF THE PREFERRED EMBODIMENTS

Figure 1:
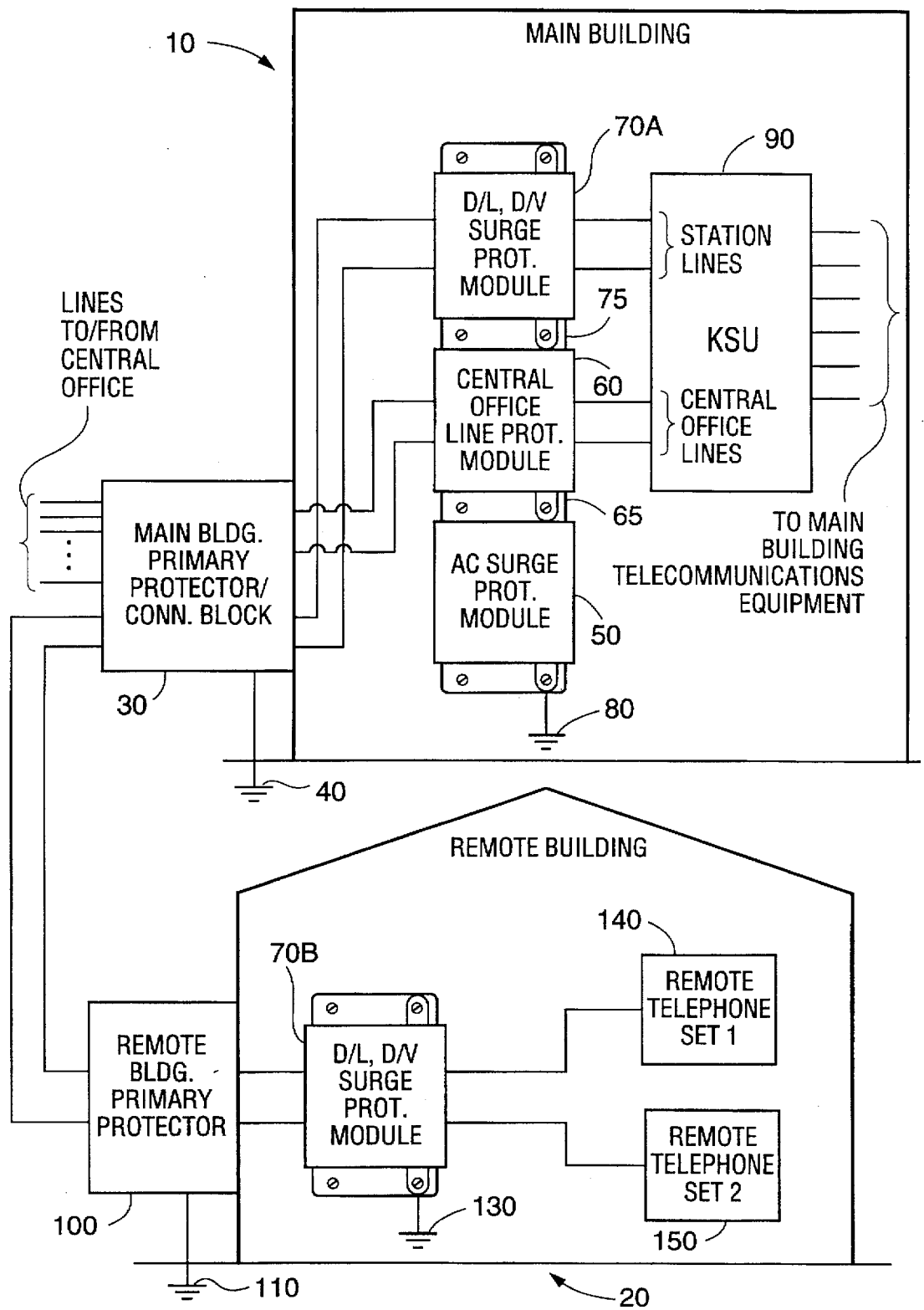
FIG. 1. is a diagram of buildings which employ telecommunication surge protectors according to the present invention.

FIG. 1 shows two environments, a main building 10 and a remote building 20, in which surge protectors according to the present invention may be used. The main building 10 is a relatively large facility with many phone lines and a key system unit (KSU) 90. The remote building 20 is a separate structure, which has two remote telecommunications sets 140, 150, which are connected to the key system unit 90 in the main building 10.

Telecommunications lines run from the central office to the main building primary protector/connector block 30. The main building primary protector/connector block 30 provides primary surge protection for the telecommunications lines at the point where the lines enter the building. The main building primary protector/connector block 30 is directly attached the building ground 40.

Some of the telecommunications lines run from the main building primary protector/connector block 30, to the central office line protection module 60. These telecommunications lines then run from the central office line protection module 60 to the key system unit 90 and are distributed by the key system unit 90 to the various telecommunications equipment (not shown) in the main building 10.

The protection module 60 is a conventional telecommunication line secondary surge protector. Protection module 60 will protect each wire of the telecommunications line with the same limiting voltage. Therefore, while the protection module 60 can be used to protect telecommunications lines wherein each wire has the same maximum expected voltage, the protection module 60 cannot be used for telecommunications lines wherein different wires have different maximum expected voltages.

The central office line protection module is detachably, mechanically connected to an AC surge protection module 50 by a module grounding connection 65. The AC surge protection module 50 is a secondary surge protector for AC power lines in the main building 10.

A dual line, dual voltage telecommunications line surge protector 70a according to the present invention is also detachably, mechanically connected to the central office line protection module 60 by a module grounding connection 75. Two telecommunications lines run from the key system unit 90 to the dual line, dual voltage surge protection module 70a. These two telecommunications lines are station lines which are respectively used for the two remote telephone sets (or station sets) 140, 150 in the remote building 20. These two telecommunications lines run from the dual line, dual voltage surge protection module 70a to the main building primary protector/connector block 30 and then to the remote building 20 and the two remote telephone sets 140, 150.

The dual line, dual voltage telecommunications surge protection module 70a provides surge protection for two telecommunications lines, with each line having up to four wires. Two of these wires are protected by surge protection circuitry of the dual line, dual voltage surge protection module 70a with a limiting voltage of about 70 volts. The other two of these wires are protected by surge protection circuitry of the dual line, dual voltage surge protection module 70a with a limiting voltage of about 240 volts.

In this embodiment, the first remote telephone 140 set is an analog, two wire telephone set. The two wires have a maximum expected voltage of about 200 volts which occurs when a ringing signal is passed on the telecommunications line. The dual line, dual voltage surge protection module 70a can be used for this line because the surge protection circuitry of 70a provides protection for two wires with a limiting voltage of about 240 volts. This allows the 200 volt ringing signal to pass through the surge protector, while blocking any surges which are significantly greater than 200 volts, thereby preventing damage to the remote telephone set 140.

The second remote telephone set 150 is a four wire telephone set, where two of the wires have a maximum expected voltage of 200 volts for a ringing signal, and two of the wires have a maximum voltage of about 50 volts. The two 50 volt wires can be used to transmit digital signals. Because the dual line, dual voltage surge protection module 70a provides protection for two wires with a limiting voltage of 240 volts and two wires with a limiting voltage of 70 volts, the dual line, dual voltage surge protection module 70a is well-suited to provide protection to this kind of dual voltage line.

Because the dual line, dual voltage surge protection module 70a is detachably, mechanically connected to the central office line protection module 60 by a module grounding connection 75, this makes it easy to add or remove the dual line, dual voltage surge protection module from an assembly of surge protection modules. Also, the dual line, dual voltage surge protector is grounded through the central office line protection module and the AC surge protection module to a common ground 80. This means that fewer grounding connections are necessary, because all three surge protection modules 70a, 60, 50 share a ground connection.

As explained above, the station lines for the remote telephone sets 140, 150, run from the key system unit 90, to the main building primary protector/connector block 30, to the remote building 20. At the remote building 20, the station lines are connected to a remote building primary protector 100. The remote building primary protector 100 provides primary protection for the station lines and is connected to the building ground 110 of the remote building 20.

The two station lines then run to the dual line, dual voltage surge protection module 70b in the remote building. the surge protection module 70b is the same as the surge protection module 70a discussed above. Because the surge protection module 70b is a dual line protection module, a single module can be used for both remote telephone sets 140, 150. This results in an economy of space, an economy of construction materials (such as housings) and an economy in installation costs relative to a single line protection module. Furthermore, only a single connection to ground 130 is required for two telecommunications lines.

FIGS. 2A to 2C show three views of an embodiment of a dual line, dual voltage surge protection module 200 according to the present invention. One side of the protection module (shown in FIG. 2A) has two input connectors 210a, b. The input connectors are female RJ-45/11 jacks. RJ-45/11 jacks are standard connectors which can be used with two wire, four wire or eight wire telecommunications lines. Because, the present embodiment of the surge protection module 200 provides protection for only four wires (two at 70 volts limiting voltage, 2 at 240 volts limiting voltage, only four of the eight possible wires are active, as shown in the diagram of the input connector at FIG. 3. The 70 volt limiting voltage wires are mapped as wires 3 and 6. The 240 volt limiting voltage wires are mapped as wires 4 and 5.

Alternatively, the input connector could be constructed as a four wire connector, as shown in FIG. 4.

As shown in FIG. 2C, there are two output connectors 220a, b. Output connector 220a is connected to input connector 210a by the surge protection circuitry (not shown) in the surge protection module 200. Output connector 220b is connected to input connector 210b by the surge protection circuitry (not shown) in the surge protection module 200.

The surge protection module 200 has two ears 250, 260. Each ear has two holes 240 for screws. These ears can be detachably, mechanically connected to other surge protection modules by screws (not shown). As shown in FIG. 2A, ear 260 is offset from ear 250, so that ears of adjacent modules fit together and do not interfere with each other. Of course, other means of providing for detachable connection of the module, such as clips, are also possible.

The surge protection module 200 also has a grounding strip 230. This grounding strip 230 runs through the module and protrudes in the vicinity of a screw hole 240 at each ear 250, 260. When the surge protection module 200 is connected to other modules, the grounding strip 230 will be electrically connected to a similar grounding strip in the other modules, so that the modules will share a common ground path.

Figure 5:
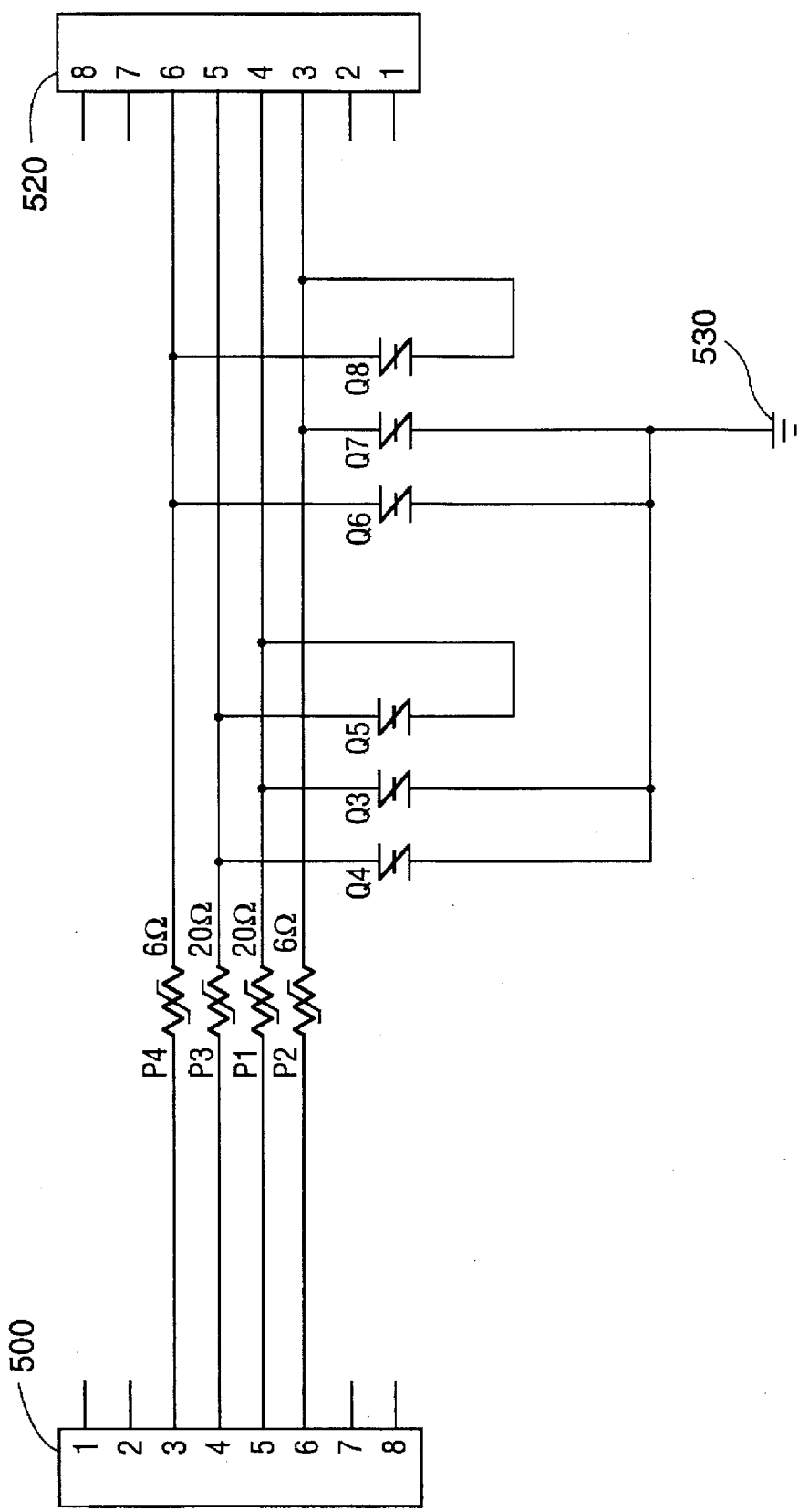

FIG. 5 shows an embodiment of surge protection circuitry for one telecommunications line according to the present invention. A input connector 500, such as a female RJ-45/11 jack is connected to the output connector 520, which is also a female RJ-45/11 jack.

Wire 3 of the input connector 500 is connected to wire 6 of the output connector 520, by a 6Ω (positive temperature coefficient) resistor P4. Wire 6 of the input connector 500 is connected to wire 3 of the output connector 520, by a 6Ω resistor P2. Wire 4 of the input connector 500 is connected to wire 5 of the output connector 520, by a 20Ω resistor P3. Wire 5 of the input connector 500 is connected to wire 4 of the output connector, by a 20Ω resistor P1.

Sidactors Q3 through Q8 are connected across the various wires and to the ground bus 530 as shown in FIG. 5. Sidactors Q3 and Q4 are 240 volt sidactors, which provide input connector wires 4 and 5 (note the wire numbering refers to the wire numbering of input connector 500) with a limiting voltage of about 240 volts. Sidactor Q5 is a 240 volt sidactor which controls the maximum relative voltage between wires 4 and 5.

Sidactors Q6 and Q7 are 70 volt sidactors, which provide input connector wires 3 and 6 with a limiting voltage of about 70 volts. Sidactor Q8 is a 70 volt sidactor which controls the maximum relative voltage between wires 3 and 6.

The surge protection circuitry shown in FIG. 5 protects different wires with different limiting voltages, by using sidactors of two different voltages (i.e., 70V and 240V). Surge protection modules according to the present invention, with different wires protected with different limiting voltages, are useful for protecting telecommunications lines wherein the wires have more than one maximum expected voltage, and they also can be useful for telecommunications line having a single maximum expected voltage (e.g., two wire lines).

Although a preferred embodiment of surge protection circuitry is shown in FIG. 5, it should be noted that other types of surge protection circuitry are also possible. For example, sidactors Q5 and Q8, limiting relative voltage between various wires, are not absolutely necessary. Alternatively, surge protection can be provided by zener diodes and metal-oxide varistors. Fuses could also be added to the surge protection circuitry.

While preferred embodiments of the present invention have been described above using illustrative examples, it will be understood by those skilled in the art that the invention is not limited by the illustrative examples and that various changes and modifications may be made without departing from the spirit or scope of the invention as set forth in the following claims.

What is claimed is:

1. A telecommunications line surge protector comprising:
   a housing;
   a first input connector connectable to a telecommunications line;
   a first output connector connectable to a telecommunications line;
   a first surge protection circuit, disposed within the housing, which connects the first input connector to the first output connector by at least two wires, including a first surge protection element that protects at least one wire from surges greater than a first limiting voltage, and including a second surge protection element that protects at least one other wire from surges greater than a second limiting voltage, where the first limiting voltage is different from the second limiting voltage;
   a second input connector connectable to a telecommunications line;
   a second output connector connectable to a telecommunications line; and
   a second surge protection circuit, disposed within the housing, which connects the second input connector to the second output connector by at least two wires, including a third surge protection element that protects at least one wire form surges greater than a third limiting voltage, and including a fourth surge protection element that protects at least one other wire from surges greater than a fourth limiting voltage, where the third limiting voltage is different from the fourth limiting voltage.

2. The telecommunications line surge protector according to claim 1, wherein:
   the first surge protection circuit connects the first input connector to the first output connector by a first wire, a second wire, a third wire and a fourth wire;
   the first and fourth wires are protected from surges greater than the first limiting voltage by the first surge protection element; and
   the second and third wires are protected from surges greater than the second limiting voltage by the second surge protection element.

3. The telecommunications line surge protector according to claim 2, wherein:
   the second surge protection circuit connects the second input connector to the second output connector by a fifth wire, a sixth wire, a seventh wire and an eighth wire;
   the fifth and eighth wires are protected from surges greater than the third limiting voltage by the third surge protection element; and
   the sixth and seventh wires are protected from surges greater than the fourth limiting voltage by the fourth surge protection element.

4. The telecommunications line surge protector according to claim 3, wherein:

the first and third limiting voltages are approximately 70 volts; and the second and fourth limiting voltages are approximately 240 volts.

5. The telecommunications line surge protector according to claim 1, further comprising:

first modular connecting means on the housing for detachably connecting the telecommunications surge protector to a second surge protection module.

6. The telecommunications line surge protector according to claim 5, further comprising:

a grounding strip which is electrically connected to a ground path in the second surge protection module when the telecommunications surge protector is connected to the second surge protection module by the first modular connecting means, and which provides grounding for the first and second surge protection circuits.

7. The telecommunication surge protector according to claim 1, wherein:

the first input connector and the first output connector are connectable to a two wire telecommunications line where each wire has a first maximum expected voltage; and the first input connector and the first output connector are alternatively connectable to a four wire telecommunications line where two of the wires have the first maximum expected voltage and two of the wires have a second maximum expected voltage.

8. The telecommunications line surge protector according to claim 7, wherein the first maximum expected voltage is approximately 200 volts and the second maximum expected voltage is approximately 50 volts.

9. The telecommunications line surge protector according to claim 8 wherein:

the first limiting voltage is approximately 70 volts;

the second limiting voltage is approximately 240 volts;

the wires having a maximum expected voltage of approximately 50 volts are protected by the first surge protection element from surges greater than the first limiting voltage of approximately 70 volts; and the wires having a maximum expected voltage of approximately 200 volts are protected by the second surge protection element from surges greater than the second limiting voltage of approximately 240 volts.

10. The telecommunications line surge protector according to claim 1, wherein the first surge protection element comprises:

a first sidactor with a limiting voltage equal to the first limiting voltage; and a second sidactor with a limiting voltage equal to the second limiting voltage.

11. A telecommunications line surge protector comprising:

a housing;

a first input connector connectable to a telecommunications line;

a first output connector connectable to a telecommunications line;

a first surge protection circuit, disposed within the housing, which connects the first input connector to the first output connector by at least two wires, including a first sidactor having a first limiting voltage, and including a second sidactor having a second limiting voltage, where the first limiting voltage is different from the second limiting voltage;

a second input connector connectable to a telecommunications line;

a second output connector connectable to a telecommunications line; and a second surge protection circuit, disposed within the housing, which connects the second input connector to the second output connector by at least two wires, including a third sidactor having a third limiting voltage, and including a fourth sidactor having a fourth limiting voltage, where the third limiting voltage is different from the fourth limiting voltage first modular connecting means on the housing for detachably connecting the telecommunications surge protector to a second surge protection module; and a grounding strip which is electrically connected to a ground path in the second surge protection module when the telecommunications surge protector is connected to the second surge protection module by the first modular connecting means, and which provides grounding for the first and second surge protection circuits.

* * * * *